No. 863,500. PATENTED AUG. 13, 1907.
T. W. BICKEL.
THERMOMETER ATTACHMENT FOR INCUBATORS.
APPLICATION FILED MAR. 25, 1907.
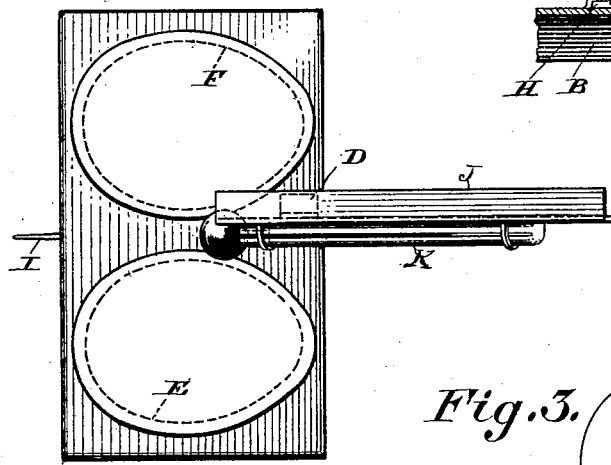
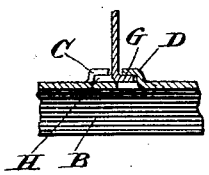
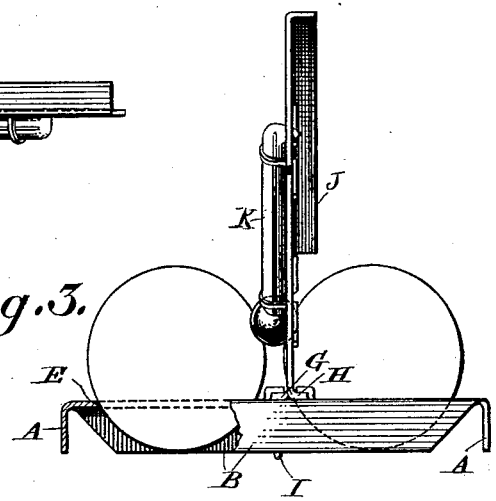
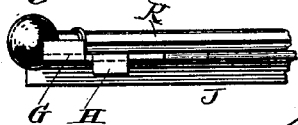
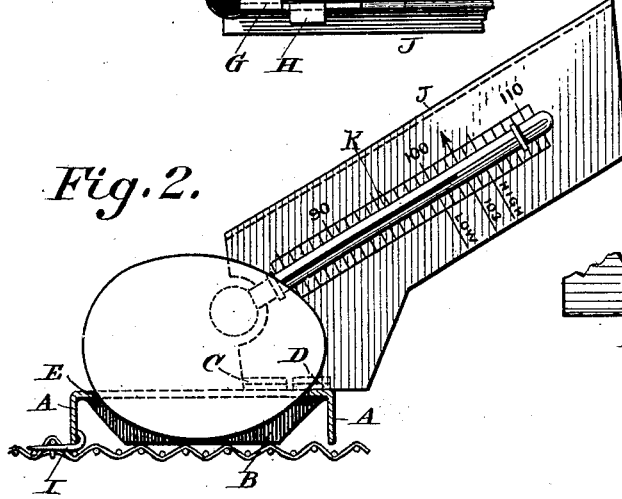
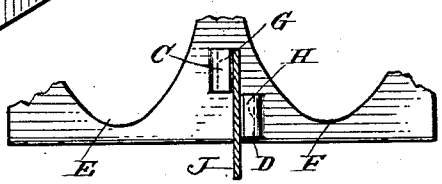
Witnesses:
Andrew J Ross
Inventor:
Travis W. Bickel

UNITED STATES PATENT OFFICE.

TRAVIS W. BICKEL, OF ALVA, OKLAHOMA TERRITORY.

THERMOMETER ATTACHMENT FOR INCUBATORS.

No. 863,500.  Specification of Letters Patent.  Patented Aug. 13, 1907.

Application filed March 25, 1907. Serial No. 364,535.

*To all whom it may concern:*

Be it known that I, TRAVIS W. BICKEL, a citizen of the United States, a resident of Alva, in the county of Woods, in the Territory of Oklahoma, have invented a Thermometer Attachment for Incubators, of which the following is a specification.

It is indispensable to success in the use of incubators that a practically even temperature shall be maintained during the incubating period, and for this purpose I have found by experiments that the thermometer should be kept in close proximity to, and, in fact, for the best results, in actual contact with the eggs. By such contact the operator is able to determine the exact temperature. I have, therefore, devised and constructed a tray or holder for the eggs, and a support or holder for the thermometer whereby the bulb of the latter may be held in contact with certain of the eggs.

The details of construction, arrangement, and combination of parts constituting my invention are hereinafter described, and illustrated in the accompanying drawings in which Figure 1 is a plan view of a tray or egg holder and the thermometer and support connected therewith. Fig. 2 is a vertical section of the apparatus. Fig. 3 is a side view, a portion of the tray or egg-holder being broken away. Fig. 4 is a detail section illustrating the means for detachably connecting the thermometer support with the egg-tray or holder. Fig. 5 is an inverted plan view of the lower portion of the thermometer and holder or support therefor. Fig. 6 is a horizontal section of the lower portion of the thermometer support together with a portion of the egg-tray or holder shown in the plan.

The tray or egg-holder proper A, is constructed of sheet metal having its sides B turned down to form supports that in practice rest on the incubator screen, as shown in Fig. 2, so that the surface of the tray is raised about one half inch from the screen. Elliptical holes are cut in the top of this tray as represented at E, F, the small ends of the opening being next to the same side of the tray. At the point between such end portions of the openings I provide two flanges or lips C and D—see Fig. 4—the same being spaced from each other and so arranged as to be adapted to receive between them the flanges C and D formed on the lower end of the thermometer support or holder J. The latter is formed of flanged metal plate provided with graduations, and the thermometer proper K is attached thereto so as to extend over the graduations in the usual way. The eggs are placed in the elliptical openings as indicated in Figs. 1, 2, and 3, with their small ends pointed in the same direction, that is to say, toward the side where the thermometer is attached. The thermometer holder J is adjusted in place by shoving the flanges C, D, under the flanges G and H on the tray A, whereby the bulb of the thermometer is brought into contact with the eggs as shown in Figs. 1 and 3. The bulb is therefore always kept in contact with the eggs during the whole incubating period, and thereby the operator is able to ascertain the existing temperature, which should always be between 103° and 104° F.

For the purpose of holding the tray A on the screen D so that it will be practically movable, I provide one side of the tray with a horizontal projecting joint I which is passed through a portion of the screen as indicated in Fig. 2. By this means the tray is held so that it will become displaced while the thermometer is held in contact with the eggs so that it will not be displaced in moving the egg tray or by the hatching chicks. Thus the only care required on the part of the operator consists in placing the attachment at the first, since it will then remain in proper position during the hatch.

What I claim is:

1. The improved incubator attachment comprising a tray having openings for reception and support of eggs, and flanges arranged on the outer side thereof adjacent to an opening, and a thermometer attachment comprising a thermometer proper and a plate to which it is secured, said plate having base flanges adapted to fit under the flanges of the tray and thereby supporting the thermometer in the required position, substantially as described.

2. The combination with an incubator screen of an egg support, having holes in its top for reception of eggs and side flanges projecting downward, one side flange being provided with a point I adapted for insertion in the convolutions of the screen, as shown and described.

TRAVIS W. BICKEL.

Witnesses:
 WALLACE M. BICKEL,
 EARL A. WINES.